(No Model.)

G. DE LAVAL.
VALVE FOR PUMPS OR ENGINES.

No. 601,059. Patented Mar. 22, 1898.

Witnesses
J. Staib
Chas. H. Smith

Inventor:
G. de Laval
L. W. Serrell & Son
Attys

THE NORRIS PETERS CO., PHOTO-LITHO., WASHINGTON, D. C.

UNITED STATES PATENT OFFICE.

GEORGE DE LAVAL, OF WARREN, MASSACHUSETTS, ASSIGNOR TO THE GEO. F. BLAKE MANUFACTURING COMPANY, OF NEW YORK, N. Y.

VALVE FOR PUMPS OR ENGINES.

SPECIFICATION forming part of Letters Patent No. 601,059, dated March 22, 1898.

Application filed October 3, 1896. Serial No. 607,742. (No model.)

*To all whom it may concern:*

Be it known that I, GEORGE DE LAVAL, a citizen of the United States, residing at Warren, in the county of Worcester and State of Massachusetts, have invented an Improvement in Valves for Pumps or Engines, of which the following is a specification.

In Letters Patent No. 542,083, granted July 2, 1895, I have represented an annular two-part valve in which the valve is held to its seat by pressure from a spring, and the pressure of the spring is relieved by the action of a rock-shaft, and the valve itself is to lift by the pressure against its face.

In some kinds of pumps the valve is liable to stick upon the seat, and in other pumps or engines it is sometimes desirable to lift the valve from its seat before the pressure is sufficient for raising such valve.

The present invention is an improvement upon the device set forth in the aforesaid patent and is made for allowing the valve to be raised from its seat by a positive motion, and this can be effected without interfering with the yielding device that allows the valve to rise when the pressure upon its face is sufficient for overcoming the yielding pressure. Hence by the present improvement I am enabled to employ the positive lift to the valve shown in the aforesaid patent without interfering with any of the properties of the valve as therein described.

Figure 1:
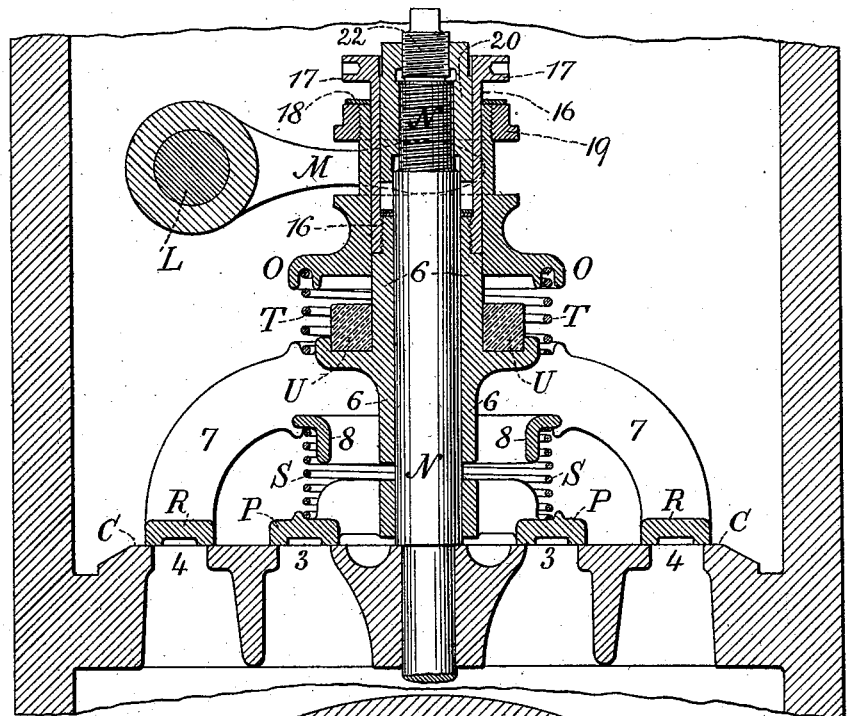
Figure 2:
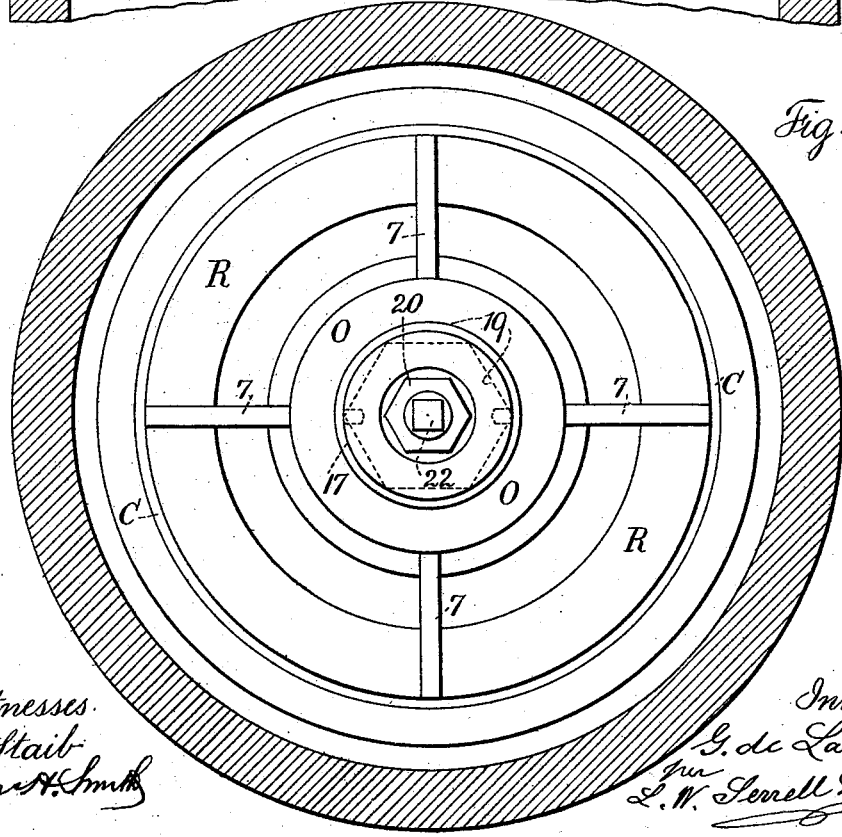

In the drawings, Figure 1 is a vertical section through the valve and the actuating device, and Fig. 2 is a plan view without the rock-shaft and toe.

The valve R is represented as annular and resting upon the valve-seat C and covering the ports 4 and having the arms 7 extending to the hub 6, which is in the form of a tube or sleeve upon the stationary rod or stem N, and the valve P is also annular and covers the ports 3, and there is a spring S between the valve P and a ring 8, that is supported by the arms 7 of the valve R. These parts are similar to those represented in the aforesaid patent and act in the manner therein described, and it is to be understood that the present invention is available with any character of valve whether the valve P is employed in addition to the valve R or whether one valve R only is made use of.

A spring T intervenes between the valve R and the collar O, and a rubber spring or block U is also advantageously employed to contact with the collar O when the spring T is compressed and prevents concussion.

A rock-shaft L and toe M are represented as the devices for giving motion to the collar O. These may, however, be of any desired character, the object being to raise or depress the collar O in lifting the valve from its seat or in lessening the pressure of the spring T upon the valve, so that the valve may rise automatically, or in increasing the pressure of such spring to cause the valve to seat itself at the proper time.

In order to give to the valve a positive motion in addition to the movements before spoken of, I provide a tubular extension 16 to the sliding stem or hub 6, and at the outer end thereof is a head 17, against which the outer end of the collar O comes into contact when such collar O is lifted, and it is advisable to introduce a washer 18, of leather or similar material, to prevent concussion, and I find it convenient to make the tubular extension 16 separate from the stem or hub 6 and to screw the parts together, as represented, and it is also advantageous to make the outer ring 19 of the collar O separate from the rest of the collar and screwed to place. It will now be understood that the outer ring 19 of the collar O comes into contact with the head 17 of the tubular extension 16 when the spring T has expanded to the point where it exerts the least power in holding the valve, and that the toe M at this point can be employed to lift the valve R from its seat by a positive motion and raise the same to any desired extent.

I find it advantageous to employ a stop or limiting device to regulate the extent to which the valve may be opened, and with this object in view the tubular nut 20 is screwed upon the reduced and screw-threaded upper end of the stationary valve-stem N, and the lower end of this tubular nut is cylindrical and adapted to pass in between the exterior of the valve-stem N and the interior of the tubular extension 16, and the space that is left between the upper end of the tubular hub 6 and the lower end of the tubular nut 20 determines the extent of the positive lifting movement given to the valve, and it is advantageous to introduce a washer of leather or similar material to prevent concussion between the upper end of the tubular hub 6 and the lower end of the tubular nut 20.

The upper end of the tubular nut 20 should be made polygonal, so that a suitable wrench may be applied to turn the same, and in order to prevent the tubular nut 20 becoming loose a lock-screw 22 is passed through the outer end or head of the tubular nut 20 and presses against the end of the stem N, so as to clamp the screw-threads and hold the tubular nut in the position to which it may have been adjusted.

I do not limit myself to any particular mechanism for giving motion to the collar O for lifting the valve from its seat, as the mechanism employed may vary, according to the circumstances where the invention is made use of.

I claim as my invention—

The combination in a valve mechanism of a stationary rod or stem, a tubular valve-stem sliding on such rod, a valve and hub connected with said stem, a collar sliding on the tubular stem and mechanism for positively moving the collar first in one direction and then in the other, a spring intervening between the collar and the valve and by which the valve is pressed toward its seat, a head and tubular extension screwed upon the tubular valve-stem, a tubular nut screwed upon the upper end of the stationary rod and a set-screw passing through the upper end of the tubular nut and acting directly upon the end of the stationary rod to clamp the nut and prevent it turning, such nut forming a stop to limit the opening movement of the valve, substantially as set forth.

Signed by me this 26th day of September, 1896.

GEORGE DE LAVAL.

Witnesses:
FRED E. COOK,
FRANK P. STEARNS.